D. H. SCHROEDER.
LAMP BURNER.
APPLICATION FILED JAN. 12, 1920.
1,375,936.
Patented Apr. 26, 1921.
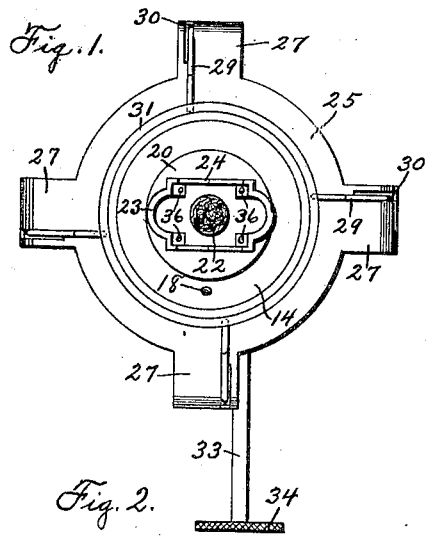
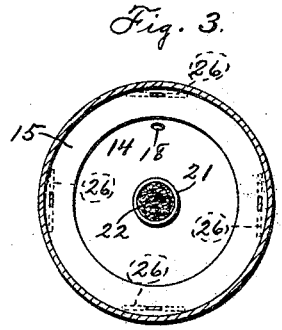
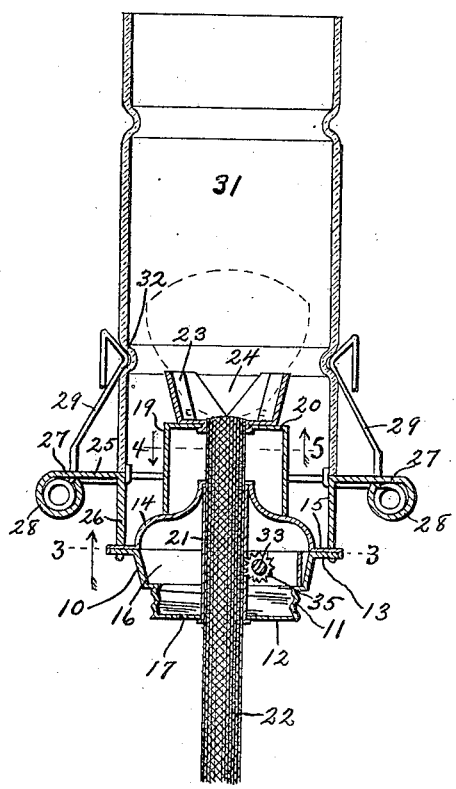
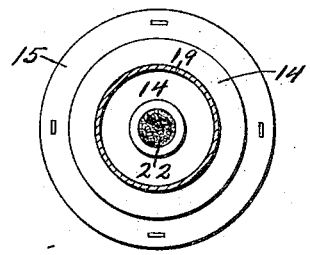
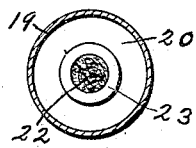
INVENTOR:
D. H. SCHROEDER

UNITED STATES PATENT OFFICE.

DAVID H. SCHROEDER, OF SLATER, IOWA.

LAMP-BURNER.

1,375,936.　　　　Specification of Letters Patent.　　Patented Apr. 26, 1921.

Application filed January 12, 1920. Serial No. 350,942.

*To all whom it may concern:*

Be it known that I, DAVID H. SCHROEDER, a citizen of the United States of America, and resident of Slater, Story county, Iowa, have invented a new and useful Lamp-Burner, of which the following is a specification.

The object of this invention is to provide an improved construction for lamp burners especially adapted for long-time continuous use, as on signal lights.

A further object of this invention is to provide an improved construction for a lamp burner with an underlying dead-air chamber which prevents heating of the device and also prevents the deposit of soot and the corroding of the metallic burner members.

A further object of this invention is to provide a lamp burner which shall attain a high degree of efficiency in use, both as to the production of a steady and uniform flame under all conditions of temperature, whether extreme heat or cold, and also as to complete combustion of the fuel oil.

My invention consists in the construction, arrangement and combination of elements hereinafter set forth, pointed out in my claims and illustrated by the accompanying drawing, in which—

Figure 1 is a plan of my improved lamp burner. Fig. 2 is a vertical section of the same showing a lamp chimney in place thereon, the position and shape of the flame being indicated by dotted lines. Fig. 3 is a cross-section on the line 3—3 of Fig. 2. Figs. 4 and 5 are cross-sections on the line 4—5 of Fig. 2, looking in opposite directions.

In the construction of the device as shown the numeral 10 designates a hollow base member which may be formed from metal by pressing and stamping, and which in its lower portion is so pressed as to form threads 11 by means of which the burner device may be removably mounted in the threaded socket of a lamp (not shown). The base member 10 is open at its top and at its bottom is closed by a plate 12. At its upper end, which preferably is of larger diameter than the lower end, the base member is formed with a peripheral horizontal flange 13. A top member 14 is separately formed and is open at its bottom and formed with a peripheral horizontal flange 15 corresponding with and overlying and secured to the flange 13 of the base member. The base member 10 and top member 14 together form an inclosed lower air chamber designated by the numeral 16, to which air is admitted through a hole 17 in the bottom 12 and from which it may escape through a hole 18 in the upper part of the top member. The top member 14 is formed tapering toward its upper end and a cylinder 19, of less diameter than the major portion of said top member, is mounted on and incloses the tapered upper part of said top member and is sealed, as by soldering, to said top member; said cylinder being closed at its upper end by an integral top plate 20. The cylinder 19 provides an inclosed upper air chamber surmounting the lower air chamber 16. A wick tube 21 is mounted centrally through the lower air chamber, extending through the top of the top member 14 and through the bottom plate 12, and is adapted to receive snugly a solid round wick such as 22 adapted to convey liquid fuel from a reservoir to the combustion chamber, said wick also extending upwardly through the upper air chamber and through the top plate 20 of the cylinder. The portion of the wick between the top of the top member 14, or upper end of the wick tube 21, and the top plate 20 of the cylinder, is not inclosed except by the walls of the cylinder 19, which walls are spaced a considerable distance from said wick, which passes loosely through the central portion of the upper air chamber. When the wick is in place and is extended through the aperture of the top plate 20 it entirely fills and closes the only opening to the upper air chamber, which thus becomes or provides a dead-air space surrounding the upper portion of the wick.

The combustion chamber is formed by a tapered shield 23 mounted on and fixed to the top plate 20 and preferably tapering outwardly somewhat toward its top, which is open. The shield 23 is formed with diametrically opposite V-shaped notches 24 for a purpose hereinafter set forth.

An annular chimney supporting plate 25 is mounted concentrically of and spaced from the cylinder 19 and is supported by a plurality of spaced standards 26 formed on and depending from said plate and at their lower ends reduced in width and extending into apertures formed in the flanges 13—15. The annular plate 25 is formed with a plurality of radially outwardly projecting lugs 27, in this instance four in number and equally spaced, and said lugs are recurved at their lower ends downwardly to form eyes 28. Spring fingers 29 are provided, one for each of the lugs 27, each of said fingers being formed with an upwardly projecting portion extending through a slot 30 in the lug, a coiled portion within the eye 28 of the lug, and an inwardly projecting portion underlying the lug and terminating in an upturned end at the inner circumference of the annular plate 25, which upturned inner ends are adapted to engage the inner surface of a lamp chimney such as 31 supported by the annular plate 25 and inclosing the upper portion of the cylindrical air chamber 19, the shield and flame. The upwardly extending portions of the spring fingers 29 preferably are bent inwardly and forcibly engage the outer surface of the chimney 31 and are then bent outwardly above the points of engagement therewith, to facilitate insertion of the chimney, which may be formed with a circumferential groove or depression 32 at the point of engagement by said fingers. Yielding movement of the fingers 29 is facilitated by the slots 30, through which the fingers may move outwardly when the chimney is inserted.

A shaft 33 is mounted for rotation in and at one side of the center of the base member 10 and has a finger wheel or head 34 on one end. A toothed wheel 35 is fixed to the shaft 33 within the base member and projects within the tube 21 and engages the wick 22 in a common manner, whereby the vertical position of the wick may be adjusted and controlled.

The space between the bottom of the chimney 31 and the flange 15 of the top member, provided by the elevation of the annular chimney supporting plate 25 through the use of the spaced standards 26, provides means for entrance of air at the base of the chimney to supply oxygen for combustion. Air so entering the chimney is projected laterally from both sides through the V-shaped notches 24 against the flame at the upper end of the wick 22 within the shield 23. This has a tendency to flatten the flame transversely as indicated in Fig. 2, the width of the flame extending at right angles to a line connecting the notches. Thus a fan-shaped or flattened flame is produced from the round wick and a maximum of illumination secured from the lamp. Air holes 36 may be formed in and at the base of the shield 23 and at the ends thereof on opposite sides of the notches 24, to provide ventilation within the shield.

The air chambers 16 and 19 surrounding the wick are of great advantage in maintaining the temperature at a uniform point by insulating the wick and wick-carrying members from the metallic parts which are in contact with or closely adjacent to the flame, and also prevent deposit of soot and carbon on or around the wick and wick-carrying members. This insulating feature is particularly true of the upper cylindrical air chamber with its imperforate dead-air space surrounding the upper portion of the otherwise uninclosed wick and immediately underlying the shield and flame. The burner constructed according to this invention provides a steady and uniform illumination which is not adversely affected by changes of temperature of the surrounding atmosphere, on account of the presence of the air chambers beneath the flame and around the wick. It is also especially adapted for continuous use for relatively long periods of time without attention or cleaning.

Soldering may be employed for securing the cylindrical chamber 19 to the top member 14, and the shield 23 to the top 20 of said cylindrical chamber, as the temperature of said members is never excessive for the reasons above set forth.

I claim as my invention—

1. A lamp burner, comprising a casing forming an imperforate dead-air chamber, chimney-supporting means carried by said casing, means for extending a wick in and centrally of said air chamber, said wick for a considerable distance being uninclosed except by the walls of said dead-air chamber and being spaced a considerable distance from said walls, and means for adjusting said wick.

2. A lamp burner, comprising a casing forming a lower air chamber, a cylindrical casing mounted on the first casing and providing an upper air chamber, a wick tube mounted through the lower chamber and communicating with the upper chamber, and a shield mounted on the upper casing, the top of the upper casing being spaced above the wick tube and formed with an aperture opening to said shield and in alinement with said wick tube, said upper casing being wholly imperforate except for the wick openings, whereby a dead-air space is provided around the upper portion of the wick when said wick is in place, said wick passing uninclosed through said dead-air space.

3. A lamp burner, comprising a perforated casing forming a ventilated lower air chamber, a casing mounted on the first casing and providing an upper air chamber, a wick tube mounted through the lower chamber and communicating with but not extending into the upper chamber, a shield mounted on the upper casing, the top of the upper casing being formed with a wick opening communicating with said shield and in vertical alinement with said wick tube, and a wick extended through said wick tube and through but spaced from the walls of said upper casing, said upper casing being wholly imperforate except for the wick openings therein, whereby a dead-air space is provided around and in contact with the upper portion of said wick.

4. A lamp burner, comprising a casing, a wick extended therethrough, said casing being formed with a peripheral horizontal flange, an annular chimney-supporting plate surrounding and spaced from the upper portion of said casing, said annular plate being formed with downwardly projecting feet spaced apart and supported by said peripheral flange, said annular plate also being formed with outwardly projecting radial lugs, said lugs being recurved to form terminal eyes, said lugs also being formed with longitudinal slots, and spring fingers having upwardly extending portions adapted to engage a lamp chimney carried by said annular plate, said upwardly extending portions passing loosely through the slots of said lugs, said fingers also being formed with coiled portions within the terminal eyes of said lugs, said fingers also being formed with inwardly projecting horizontal portions underlying said lugs.

5. A lamp burner, comprising a casing, a wick extended therethrough, said casing being formed with a peripheral horizontal flange, an annular chimney-supporting plate surrounding and spaced from the upper portion of said casing, said annular plate being formed with supporting means connected with said flange, said annular plate also being formed with outwardly projecting radial lugs, said lugs being formed with longitudinal slots, and spring fingers having upwardly extending portions adapted to engage a lamp chimney carried by said annular plate, said upwardly extending portions passing loosely through the slots of said lugs, said fingers also being formed with coiled portions below said lugs, said fingers also being formed with horizontal portions extending beneath said annular plate.

Signed at Slater, in the county of Story and State of Iowa, this 29th day of December, 1919.

DAVID H. SCHROEDER.